US007069722B2

(12) United States Patent
Lönn

(10) Patent No.: US 7,069,722 B2
(45) Date of Patent: Jul. 4, 2006

(54) HYDRAULIC SYSTEM FOR A VEHICLE, A VEHICLE INCLUDING SUCH A HYDRAULIC SYSTEM AND A SUPLEMENTARY UNIT FOR SUCH A VEHICLE

(75) Inventor: Jan Lönn, Lagan (SE)

(73) Assignee: Cargotec Patenter Handelsbolag, Ljungby (SE)

( * ) Notice: Subject to any disclaimer, the term of this patent is extended or adjusted under 35 U.S.C. 154(b) by 11 days.

(21) Appl. No.: 10/503,736

(22) PCT Filed: Feb. 7, 2003

(86) PCT No.: PCT/SE03/00205

§ 371 (c)(1),
(2), (4) Date: Aug. 6, 2004

(87) PCT Pub. No.: WO03/068660

PCT Pub. Date: Aug. 21, 2003

(65) Prior Publication Data

US 2005/0160726 A1 Jul. 28, 2005

(30) Foreign Application Priority Data

Feb. 11, 2002 (SE) .................................... 0200376

(51) Int. Cl.
*F16D 31/02* (2006.01)

(52) U.S. Cl. .......................................... 60/430; 60/421

(58) Field of Classification Search .................. 60/421, 60/428, 430
See application file for complete search history.

(56) References Cited

U.S. PATENT DOCUMENTS

| | | | | |
|---|---|---|---|---|
| 3,972,187 | A * | 8/1976 | Ital et al. | 60/428 |
| 5,146,746 | A * | 9/1992 | Nagai et al. | 60/427 |
| 5,261,232 | A * | 11/1993 | Maffini et al. | 60/430 |
| 5,481,874 | A * | 1/1996 | Budzich | 60/428 |
| 5,946,910 | A * | 9/1999 | Hayashi et al. | 60/421 |
| 6,135,694 | A | 10/2000 | Trego et al. | |
| 6,612,109 | B1 * | 9/2003 | Mickelson | 60/421 |
| 2001/0030085 | A1 | 10/2001 | Nagata et al. | |

* cited by examiner

*Primary Examiner*—Edward K. Look
*Assistant Examiner*—Michael Leslie
(74) *Attorney, Agent, or Firm*—Nixon & Vanderhye P.C.

(57) ABSTRACT

A hydraulic system for a vehicle has a hydraulic, load carrying assembly which has a movable structural element and a hydraulic device for actuating the structural element. The hydraulic system has a primary circuit having a servo device, a stationary hydraulic pump, a directional valve, and the hydraulic device, which are arranged in order to operate the assembly. The hydraulic system has a supplementary circuit, being connected to the primary circuit and including a variable hydraulic pump which is arranged in order to supply an adjustable addition of hydraulic oil to the hydraulic device, and a proportional valve being arranged between the variable hydraulic pump and the hydraulic device in order to regulate the flow of hydraulic oil to the hydraulic device as a function of a received flow signal.

12 Claims, 2 Drawing Sheets

HYDRAULIC SYSTEM FOR A VEHICLE, A VEHICLE INCLUDING SUCH A HYDRAULIC SYSTEM AND A SUPLEMENTARY UNIT FOR SUCH A VEHICLE

CROSS-REFERENCES TO RELATED APPLICATIONS

This application is the U.S. national phase of International PCT Application No. PCT/SE03/00205, filed Feb. 7, 2003, which designated the United States. PCT/SE03/00205 claims priority of Swedish Patent Application No. 0200376-2, filed Feb. 11, 2002. The entire contents of these applications are incorporated herein by reference.

BACKGROUND OF THE INVENTION

The present invention relates to a hydraulic system for a vehicle, comprising at least one hydraulic, load-carrying assembly which includes at least one movable structural element and at least one hydraulic cylinder for actuating the structural element, said hydraulic system comprising a primary circuit which includes a servo device, a stationary hydraulic pump driven by a motor, a directional valve and said at least one hydraulic cylinder, said directional valve being arranged between the hydraulic pump and the hydraulic cylinder for allowing hydraulic oil to flow to the hydraulic cylinder at a servo signal from the servo device in order to operate said assembly.

The invention also relates to a vehicle comprising such a hydraulic system and a supplementary unit for such a vehicle.

The invention is particularly applicable for a vehicle in the form of a truck provided with forks or a yoke.

In hydraulic systems of the above-mentioned type, the speed at which a hydraulic assembly performs its task is substantially proportional to the speed of the motor of the vehicle. This is true whatever the load applied to the motor may be. In order to achieve the maximum hoisting speed in a lifting assembly provided with forks, e.g. in a fork lift truck, the truck driver has to run up the motor to a maximum even when the forks are not carrying any cargo. Notwithstanding the fact that the motor is at maximum speed, only a fractional part of the motor power is utilised when empty forks are lifted at maximum speed. It is not efficient to utilise the motor in this way, but it results in a high specific consumption of fuel, large exhaust gas emissions and a high sound level. If, on the other hand, priority is given to a low specific consumption of fuel, small exhaust gas emissions and a low sound level, a lower hoisting speed has to be accepted, which influences the hoisting capacity of the truck in a negative sense with respect to the cargo handled per unit of time. However, the industry makes great demands upon productivity and speediness. In many handling situations, the hoisting speed plays an important role, particularly when larger ranges of lift are concerned.

Generally, the above-mentioned is true for all types of hydraulic assemblies of a fork lift truck. However, as a rule, the lifting assembly is the unit which requires the largest quantity of hydraulic oil and, furthermore, for the longest time, which is the reason why the above-mentioned problem normally is largest just in the lifting assembly.

Accordingly, when utilising a hydraulic assembly which performs a hydraulic function in a hydraulic system of the above-mentioned type, there is a general need of optimising the motor speed while maintaining a predetermined maximum speed of the assembly, or alternatively, of maximising the speed of the assembly while taking the load on the assembly into consideration.

SUMMARY OF THE INVENTION

The object of the present invention is to provide a hydraulic system of the type described in the introductory part, which to an essential degree provides for the above-mentioned needs, and which enables an optimisation of the efficiency of the motor of the vehicle and the power output from said motor.

The hydraulic system according to the invention is characterized in that it comprises a supplementary circuit which is connected to the primary circuit and includes a variable hydraulic pump driven by the motor, said pump being arranged for supplying an adjustable addition of hydraulic oil to the assembly, and a proportional valve which is arranged between the variable hydraulic pump and the assembly in order to receive a flow signal, said flow signal controlling the throttling of the proportional valve and thereby regulating the flow of hydraulic oil to the assembly, said variable hydraulic pump including a regulator which is arranged for controlling the displacement of the variable hydraulic pump, so that the variable hydraulic pump, independently of the flow of hydraulic oil through the proportional valve, supplies the quantity of hydraulic oil which is required in order to maintain a hydraulic pressure necessary for the operation of the assembly.

BRIEF DESCRIPTION OF TEE DRAWINGS

The invention will be described in detail in the following, with reference to the drawings.

DETAILED DISCUSSION OF PREFERRED EMBODIMENTS

Figure 1:
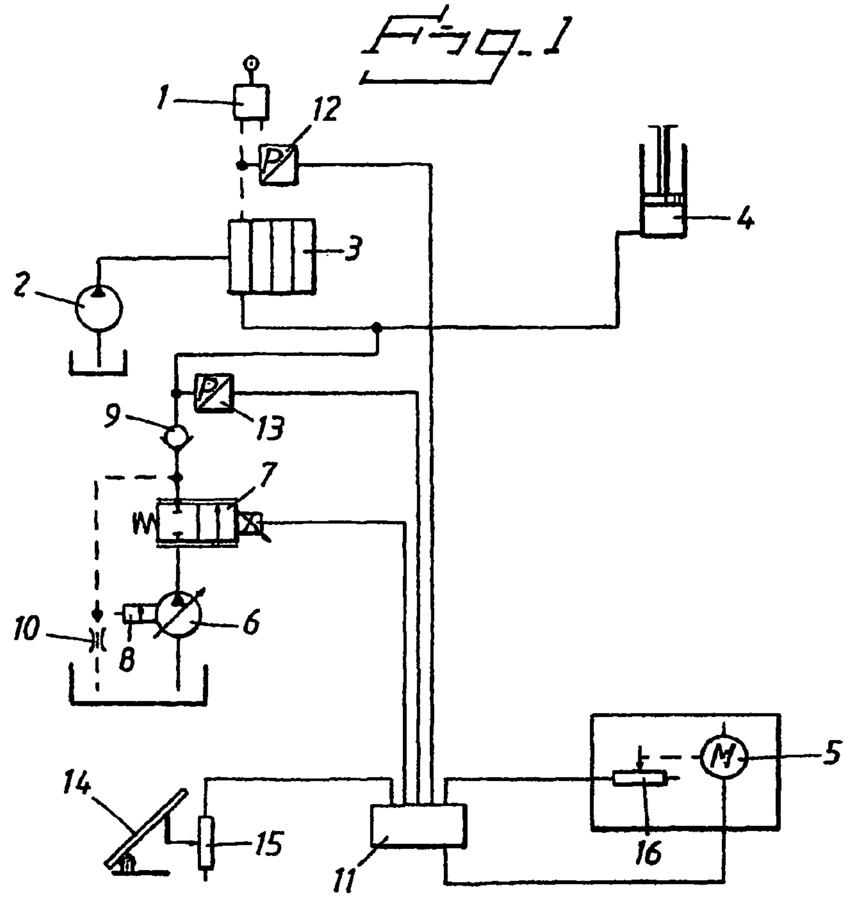
FIG. 1 shows schematically a hydraulic system according to the invention which is adapted to a fork lift truck including a lifting assembly.
Figure 4:
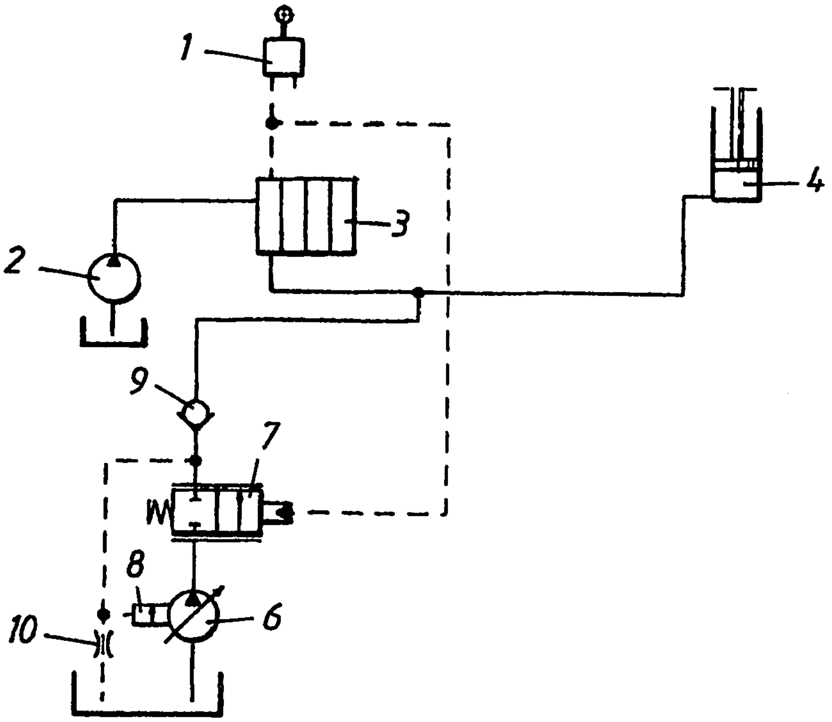
FIG. 4 shows schematically a second embodiment of a hydraulic system according to the invention.
Figure 5:
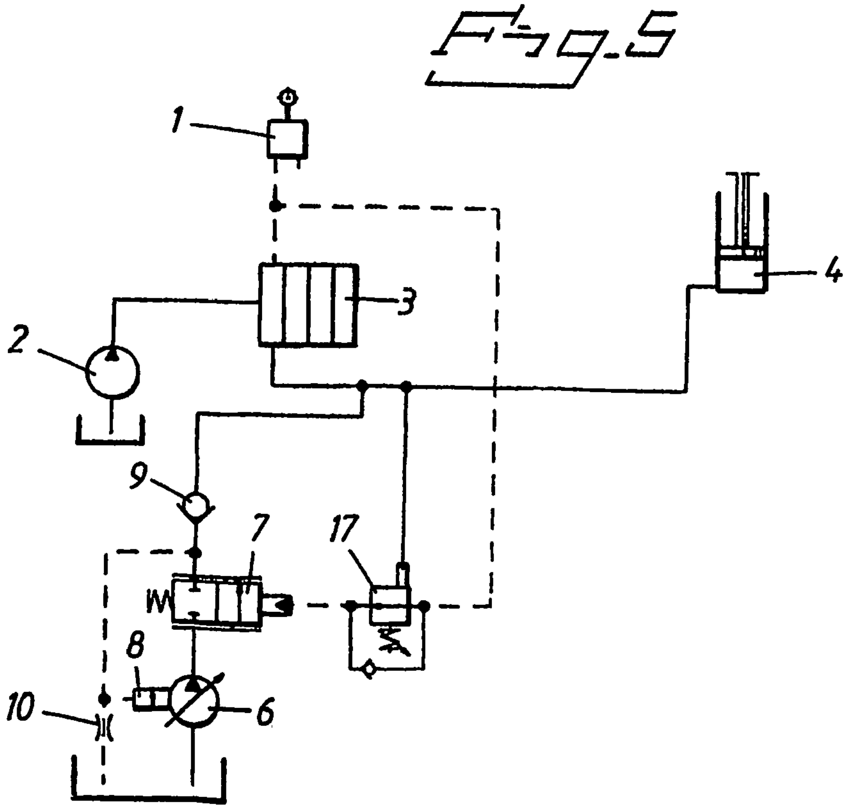
FIG. 5 shows schematically a third embodiment of a hydraulic system according to the invention.

FIGS. 1, 4 and 5 show schematically three different hydraulic systems for a fork lift truck. Each hydraulic system comprises a primary circuit in the form of a conventional lifting circuit for operating a hydraulic lifting assembly (not shown) including vertically adjustable forks. The primary circuit includes a servo device 1. In this case, the servo device 1 is a hydraulic servo device, however, alternatively it can be an electric servo device. The primary circuit further includes a stationary hydraulic pump 2, i.e. a hydraulic pump having a constant or fixed displacement, a directional valve 3 and a hydraulic member 4 in the form of a hydraulic cylinder. The stationary hydraulic pump 2, which usually is a gear pump in conventional lifting circuits, is driven by a motor 5 (see FIG. 1). The directional valve 3 is arranged between the hydraulic pump 2 and the hydraulic cylinder 4 for allowing hydraulic oil to flow to the hydraulic cylinder 4 at a hydraulic servo signal from the hydraulic servo device 1 in order to operate the lifting assembly.

According to the invention, each hydraulic system comprises a supplementary circuit, which is connected to the primary circuit with a view to supply an adjustable addition of hydraulic oil to the primary circuit when lifting the forks of the lifting assembly. To this purpose, the supplementary circuit includes a variable hydraulic pump 6, i.e. a hydraulic pump having a variable displacement. Preferably, the variable hydraulic pump 6 is an axial piston pump, however, alternatively also other types of variable hydraulic pumps can be used. The variable hydraulic pump 6, as well as the stationary hydraulic pump 2, is driven by the motor 5. The supplementary circuit also includes a proportional valve 7, through which the variable hydraulic pump 6 is connected to the primary circuit. The proportional valve 7 is arranged in order to receive a flow signal, controlling the throttling of the proportional valve 7, which in turn regulates the flow of the addition of hydraulic oil. The variable hydraulic pump 6 includes a conventional load detecting regulator 8 detecting the load on the forks when the variable hydraulic pump 6 is in operation. A non return valve 9 is arranged in order to protect the hydraulic pump 6 against the hydraulic pressure in the primary circuit when the hydraulic pump 6 is out of operation, and a check valve 10 is arranged in order to relieve the hydraulic pump 6 in this idle condition.

FIG. 1 shows a first embodiment of the hydraulic system according to the invention. In this case, the supplementary circuit includes an electronic control unit 11, which is arranged in order to emit said flow signal, in the form of an electric signal, to the proportional valve 7. If the truck driver lifts up or lowers the forks, the control unit 11 receives information about this through a first sensor 12 in the form of a pressure transducer, which is arranged for detecting the hydraulic servo signal from the hydraulic servo device 1 and for transmitting an electric control signal to the control unit 11, said control signal being a function of the hydraulic servo signal. The control unit 11 also receives information about the load on the forks from a second sensor 13 in the form of a pressure transducer detecting the pressure in the hydraulic cylinder 4 and transmitting an electric load signal to the control unit 11, said load signal being a function of the load on the lifting assembly. In this embodiment, the driver adjusts the speed of the motor 5 by means of an electric throttle member. The throttle member includes a throttle pedal 14, which is operated by the driver. The position of the throttle pedal 14 is detected by a third sensor 15, for example in the form of a potentiometer, which transmits an electric throttle-regulating signal to the control unit 11. The control unit 11, in its turn, transmits an electrical speed signal to an adjusting member 16, which is arranged at the motor 5 in order to regulate the motor 5 speed. Thereby, the adjusting member 16 can be internal, i.e. integrated in the motor 5, or external, i.e. arranged outside the motor 5. The control unit 11 also receives feed back information about the speed of the motor 5 through a fourth sensor (not shown) in the form of a revolution counter.

A hoisting sequence is initiated when the driver presses down the throttle pedal 14 and causes the hydraulic system to pressurize the hydraulic cylinder 4 by means of the hydraulic servo device 1 so that the forks start to rise. The control unit 11 records the hoisting speed which is desired by the driver through the first sensor 12, and through the third sensor 15 also the motor speed which is desired by the driver. Furthermore, the control unit 11 records the load on the forks through the second sensor 13. The control unit 11 continuously processes the received lift, throttle-regulating, and load signals. Preferably, the control unit 11 includes a programmable microprocessor, which performs said processing. Based upon the received signals, the control unit 11 delivers a speed signal to the adjusting member 16 and a flow signal to the proportional valve 7. As a response to the flow signal, the proportional valve 7 opens and allows the variable hydraulic pump 6 to contribute to said addition of hydraulic oil. Owing to the fact that the hydraulic pump 6 by means of the regulator 8 is load detecting, the regulator 8 regulates the displacement of the hydraulic pump 6 so that the hydraulic pump 6 only supplies the quantity of hydraulic oil which is required in order to maintain a hydraulic pressure required for the hoisting work.

The hydraulic system according to FIG. 1 can be used in order to optimise the motor speed, while taking the load on the forks into consideration, and maintaining a predetermined maximum hoisting speed of the lifting assembly. When the hydraulic system is utilised in this way, the control unit 11 is programmed so that it does not allow the motor speed to exceed a predetermined speed value for the load in question. Accordingly, the speed value is a function of the load on the forks. Furthermore, the control unit 11 is programmed so that it, at the predetermined speed value, allows the variable hydraulic pump 6 to supply an addition of hydraulic oil which compensates for the reduced motor speed in such a way that the predetermined maximum hoisting speed is maintained.

Figure 2:
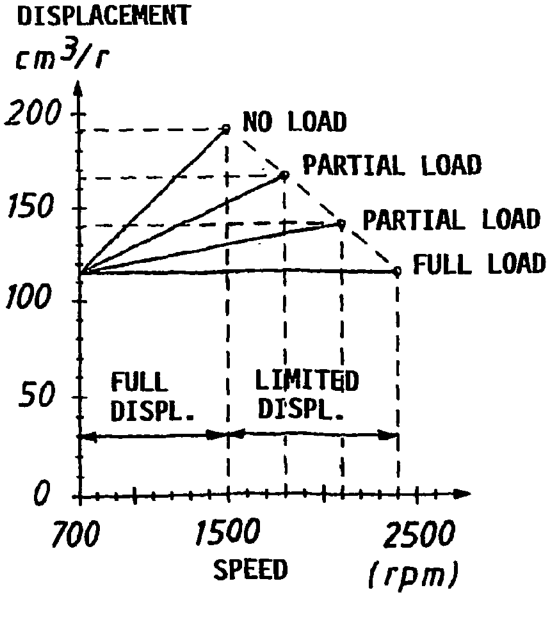
FIG. 2 is a diagram which illustrates the use of the hydraulic system according to FIG. 1 in order to optimise the motor speed of the fork lift truck with maintained hoisting speed of the lifting assembly.

FIG. 2 is a diagram which illustrates the use of the hydraulic system according to FIG. 1 in this way, i.e. in order to minimize the motor speed at different loads while maintaining a predetermined maximum hoisting speed of the lifting assembly. In the example which is illustrated by the diagram, the maximum speed of the motor 5 is 2400 revolutions per minute (rpm), the displacement of the stationary hydraulic pump 2 is 115 cubic centimeters per revolution ($cm^3/r$) and the maximum displacement of the variable hydraulic pump 6 is 75 $cm^3/r$. Accordingly, with the supplementary circuit, it is possible to increase the displacement of the hydraulic system from 115 $cm^3/r$ to 190 $cm^3/r$ by means of the variable hydraulic pump 6 and, consequently, it is possible to reduce the motor speed in the same proportion, i.e. from 2400 rpm to approximately 1500 rpm, with a maintained hoisting speed. In the present example, this is completely utilized when the forks are lifted without any cargo, as is illustrated by the upper graph in the diagram, where the predetermined speed value is 1500 rpm. As long as the motor speed is lower than the predetermined speed value, the control unit 11 is programmed in order to deliver a speed signal to the adjusting member 16 which corresponds to the throttle-regulating signal from the third sensor 15. Since the load on the forks is small in this case, the control unit 11 allows the proportional valve 7 to open so that the displacement of the variable hydraulic pump 6 increases relatively quickly with increasing motor speed, said displacement reaching its maximum value, i.e. 75 $cm^3/r$, at 1500 rpm. At this speed the forks achieve the above-mentioned maximum hoisting speed. Even if the driver in this situation gives more throttle, the control unit 11 will limit the motor speed to just 1500 rpm. When hoisting cargo, the speed value and the flow signal are adapted to the motor capacity and the actual load on the forks, so that the maximum hoisting speed is maintained, which is illustrated by the two middle graphs in the diagram. Accordingly, the actual load controls how quickly the displacement of the variable hydraulic pump 6 increases with increasing motor speed, and the speed value is chosen so that said maximum hoisting speed is maintained. Consequently, the control unit 11 gradually allows higher and higher speed values when the load increases. Simultaneously, the control unit 11 reduces the flow of hydraulic oil through the proportional valve 7 correspondingly, and as the flow of hydraulic oil decreases, the displacement of the variable hydraulic pump 6 is decreased by the agency of the regulator 8. In the present example, the motor 5 is relatively weak, which is the reason why the control unit 11 at full load, i.e. the maximum load allowed on the forks, has to allow the motor speed to increase to 2400 rpm in order to be capable of hoisting the cargo. Simultaneously, the control unit 11 throttles the addition of hydraulic oil by means of closing the proportional valve 7, wherein the displacement of the variable hydraulic pump 6 decreases to zero. Accordingly, in this case, the above-mentioned predetermined speed value is equal to the maximum speed of the motor 5, as is illustrated by the lower graph. If the motor performance allows it, however, the speed value is chosen so that it is lower than the maximum speed of the motor 5 also at maximum load. In other words, the lowest possible speed value is chosen for each respective loading situation while taking the motor performance and the desired maximum hoisting speed into consideration.

However, there may be situations when the motor load requires that the maximum speed value allowed by the control unit 11 is exceeded, for example when the driver wants to lift the forks and simultaneously drive the truck forwards or backwards. Accordingly, the control unit 11 preferably is arranged in order to identify such situations, for example by means of detecting the position of the gear shift lever of the truck, and in order to allow a higher speed value in such situations. In order to prevent an excessively high, not permissible hoisting speed in such situations, the control unit 11 is programmed in order to adjust the flow of hydraulic oil through the proportional valve 7 so that the displacement of the variable hydraulic pump 6 is decreased in proportion to the speed increase.

Alternatively, the hydraulic system according to FIG. 1 can be utilised in order to maximise the hoisting speed of the lifting assembly while taking the load on the forks into consideration. When the hydraulic system is utilised in this way, the control unit 11 is programmed so that it delivers a speed signal to the adjusting member 16 without limiting the motor speed, said speed signal corresponding to the throttle-regulating signal from the third sensor 15. Furthermore, the control unit 11 is programmed in order to maximise said addition of hydraulic oil while taking the actual load and the capacity of the motor 5 into consideration or, which is equivalent, in order to maximise the displacement of the variable hydraulic pump 6. Since the supplementary circuit in this case is capable of delivering a large addition of hydraulic oil to the primary circuit, the supplementary circuit preferably is connected directly to the hydraulic cylinder 4.

Figure 3:
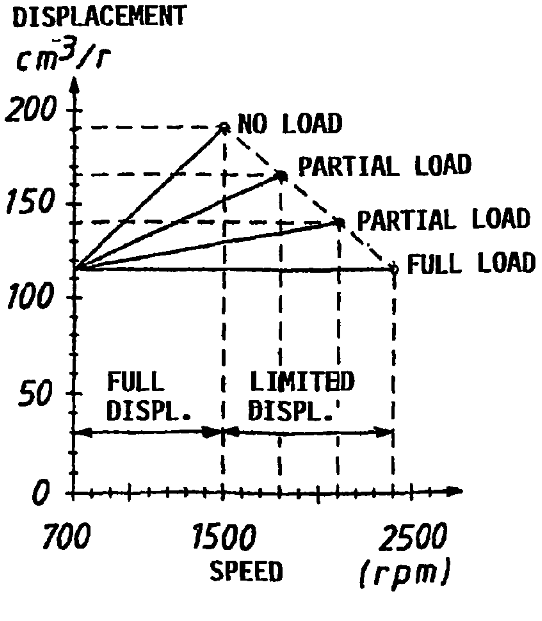
FIG. 3 is a diagram which illustrates the use of the hydraulic system according to FIG. 1 in order to maximise the hoisting speed of the lifting assembly.

FIG. 3 is a diagram which illustrates the use of the hydraulic system according to FIG. 1 in this way, i.e. in order to maximise the hoisting speed of the lifting assembly. As is the case in FIG. 2, the maximum speed of the motor 5 is 2400 rpm, the displacement of the stationary pump is 115 $cm^3/r$ and the maximum displacement of the variable hydraulic pump 6 is 75 $cm^3/r$. In this case, however, the displacement increase made possible by the variable hydraulic pump 6 is utilised completely in order to maximise the hoisting speed for all loads. The graphs in the diagram shown in FIG. 3 initially follow the graphs described above in connection with FIG. 2. The displacement of the variable hydraulic pump 6 increases with increasing motor speed as long as the motor 5 is capable of driving the variable hydraulic pump 6. The control unit 11 continuously monitors the motor speed by means of the mentioned feed back revolution counter, and when the motor 5 reaches its capacity roof, the control unit 11 is programmed in order to restrict the flow of hydraulic oil through the proportional valve 7, so that the displacement of the variable hydraulic pump 6 thereafter remains constant.

In an alternative (not shown) embodiment, the supplementary circuit lacks a feed back of the motor speed to the control unit. In this case, it is determined how large the flow of hydraulic oil through the proportional valve should be at different loads by means of practical testing, and the control unit is programmed accordingly. The displacement of the variable hydraulic pump 6 normally can be allowed to assume its maximum value without load on the forks. With full load, preferably the largest displacement which the motor capacity can handle will be chosen. With partial loads, the control unit 11 can be programmed so that the allowed displacement is proportional to the load. Alternatively, the control unit 11 can be programmed so that the allowed displacement is a function of the load in another way. Since the control unit does not regulate the motor speed, a conventional wire throttle can be utilised in this embodiment instead of the electric throttle member described in connection with FIG. 1.

Also the embodiment according to FIG. 4 is intended to be used in order to maximise the hoisting speed of the lifting assembly. In this case, the proportional valve 7 has a hydraulic control. The proportional valve 7 is connected directly to the hydraulic servo device 1 in order to receive a hydraulic flow signal therefrom, said flow signal being a function of said hydraulic servo signal. Thereby, the proportional valve 7 is arranged in order to regulate the flow of hydraulic oil as a function of the flow signal. In order to prevent an overload of the motor of the truck, the regulator 8 of the variable hydraulic pump 6 includes a power regulating device (not shown). The power regulating device is arranged in order to limit the displacement of the hydraulic pump 6, and thereby also its need of torque, in proportion to the load on the lifting assembly, as a function of the motor performance and the maximum load allowed on the forks. Thereby, the power regulating device is calibrated, while taking the motor 5 capacity into consideration, in order to maximise the flow of hydraulic oil through the proportional valve 7 in each loading situation.

Also in the embodiment according to FIG. 5, the proportional valve 7 has a hydraulic control, but the regulator 8 according to this third embodiment lacks a power regulating device. Instead, the power regulating function is handled by a pilot controlled relief valve 17, through which the proportional valve 7 is connected to the hydraulic servo device 1 in order to receive the hydraulic flow signal therefrom, through the relief valve 17. The relief valve 17 is connected to the primary circuit in order to receive a hydraulic pilot signal being a function of the load on the assembly. In order to prevent overload of the motor of the truck, the relief valve 17 is arranged in order to reduce the flow signal as a function of the pilot signal. Thereby, the relief valve 17 is calibrated, while taking the capacity of the motor 5 into consideration, in order to maximise the flow of hydraulic oil through the proportional valve 7 in each loading situation.

In the foregoing, the invention has been described with respect to a lifting assembly including a hydraulic cylinder for lifting up and lowering forks. However, it will be understood that the principle of the invention is applicable to other hydraulically controlled functions of the lifting assembly, for example tilting, lateral displacement, or spreading of the forks.

It will also to be understood that the invention is applicable to other types of hydraulic assemblies than a lifting assembly of the type described. Furthermore, it will be understood that the invention is not limited to hydraulic assemblies in which the hydraulic devices exclusively are hydraulic cylinders. The invention is equally well applicable to assemblies comprising one or several rotary or hydraulic motors, which for example is the case when the assembly includes a rotator.

It will also be understood that, within the scope of the invention, it is possible to connect several proportional valves in the supplementary circuit to the variable hydraulic pump in order to supply hydraulic oil to the primary circuit through several parallel flow paths. For instance, it is possible to connect the supplementary circuit to the primary circuit through proportional valves between the stationary pump and the directional valve as well as between the directional valve and the hydraulic device.

It will also be understood that the invention is not limited to fork lift trucks. The invention is equally well applicable to other cargo handling vehicles which include a hydraulic assembly for cargo handling.

The supplementary circuit can be installed when manufacturing new vehicles. However, the supplementary circuit is also suitable for upgrading installation in older vehicles. In such cases, the supplementary circuit is arranged in a supplementary unit, which is installed in the older vehicle and which is connected to the primary circuit of the vehicle in order to form a hydraulic system of the above-mentioned kind.

As a rule, the supplementary circuit is very reliable. If the supplementary circuit, in spite of this, should stop functioning, the primary circuit will normally not be affected. Accordingly, if the supplementary circuit for example is installed in an older fork lift truck in order to increase the hoisting speed of the forks or in order to reduce the motor speed with maintained hoisting speed, the fork lift truck can function in a normal way also in case the supplementary circuit should stop functioning. When manufacturing a new vehicle, the stationary hydraulic pump preferably is dimensioned in such a way that a normal, or at least an acceptable vehicle performance is achieved even if the supplementary circuit should stop functioning.

The invention claimed is:

1. A hydraulic system for a vehicle, comprising at least one hydraulic, load-carrying assembly which includes at least one movable structural element and at least one hydraulic device for actuating the structural element, said hydraulic system comprising a primary circuit which includes a servo device, a stationary hydraulic pump driven by a motor, a directional valve, and said at least one hydraulic device, said directional valve being arranged between the hydraulic pump and the hydraulic device for allowing hydraulic oil to flow to the hydraulic device at a servo signal from the servo device in order to operate said assembly, wherein the hydraulic system comprises a supplementary circuit which is connected to the primary circuit and includes a variable hydraulic pump which is driven by the motor and which is arranged for supplying an adjustable addition of hydraulic oil to the hydraulic device, and a proportional valve which is arranged between the variable hydraulic pump and the hydraulic device in order to regulate the flow of hydraulic oil to the hydraulic device as a function of a received flow signal, said variable hydraulic pump including a load-detecting regulator which is arranged for detecting the load on the hydraulic device when the variable hydraulic pump is in operation, wherein the proportional valve is connected to the servo device through a pilot controlled relief valve in order to receive said flow signal from the servo device via the relief valve, said flow signal being a function of said servo signal, and wherein the relief valve is connected to the primary circuit in order to receive a hydraulic pilot signal and to reduce the flow signal as a function of the pilot signal, said pilot signal being a function of the load on the assembly.

2. Hydraulic system according to claim 1, wherein the supplementary circuit includes an electronic control unit, which is connected to the primary circuit through a first sensor which is arranged at the servo device in order to detect said servo signal and to transmit an electric control signal to the control unit, said control signal being a function of the servo signal, as well as through a second sensor which is arranged at the hydraulic device in order to detect the load on the same and to transmit an electric load signal to the control unit, said load signal being a function of the load on the assembly, and wherein the proportional valve is connected to the control unit in order to receive said flow signal in the form of an electric signal therefrom, said flow signal being a function of the control signal and the load signal.

3. Hydraulic system according to claim 2, wherein the supplementary circuit includes a throttle pedal and a third sensor, said third sensor detecting the position of the throttle pedal and transmitting an electric throttle-regulating signal to the control unit, and wherein the control unit is arranged for transmitting an electric speed signal to an adjusting member which is arranged at the motor in order to regulate the motor speed, said speed signal being a function of the throttle-regulating signal, the adjusting signal and the load signal.

4. Hydraulic system according to claim 3, wherein the control unit includes a microprocessor.

5. Hydraulic system according to claim 4, wherein the microprocessor is programmed so that the control unit restricts the speed of the motor to a predetermined speed value for each load on the assembly.

6. A cargo handling vehicle including a hydraulic system and at least one hydraulic, load carrying assembly which includes at least one movable structural element and at least one hydraulic device for actuating the structural element, said hydraulic system comprising a primary circuit which includes a servo device, a stationary hydraulic pump driven by a motor, a directional valve and said at least one hydraulic device, said directional valve being arranged between the hydraulic pump and the hydraulic device for allowing hydraulic oil to flow to the hydraulic device at a servo signal from the servo device in order to operate said assembly, wherein the hydraulic system comprises a supplementary circuit which is connected to the primary circuit between said directional valve and said hydraulic device and includes a variable hydraulic pump being driven by the motor and which is arranged for supplying an adjustable addition of hydraulic oil to the hydraulic device, and a proportional valve which is arranged between the variable hydraulic pump and the hydraulic device in order to regulate the flow of hydraulic oil to the hydraulic device as a function of a received flow signal, said variable hydraulic pump including a load detecting regulator which is arranged in order to detect the load on the hydraulic device when the variable hydraulic pump is in operation.

7. Vehicle according to claim 6, wherein the vehicle is a truck provided with forks or a yoke.

8. A supplementary unit for upgrading a vehicle, said vehicle including at least one hydraulic, load-carrying assembly which includes at least one movable structural element and at least one hydraulic device for actuating the structural element, and a hydraulic system which comprises a primary circuit including a servo device, a stationary hydraulic pump driven by a motor, a directional valve and said at least one hydraulic device, said directional valve being arranged between the hydraulic pump and the hydraulic device in order to allow hydraulic oil to flow to the hydraulic device at a servo signal from the servo device in order to operate said assembly, wherein the supplementary unit comprises a supplementary circuit which is arranged in order to be connected to the primary circuit between said directional valve and said hydraulic device and to constitute a portion of said hydraulic system, said supplementary circuit including a variable hydraulic pump which is arranged in order to be driven by the motor and to supply an adjustable addition of hydraulic oil to the hydraulic device, said variable hydraulic pump including a load detecting regulator which is arranged for detecting the load on the hydraulic device when the variable hydraulic pump is in operation, and a proportional valve which is arranged in order to be connected between the variable hydraulic pump and the hydraulic device for regulating the flow of hydraulic oil to the hydraulic device as a function of a received flow signal.

9. A hydraulic system for a vehicle, comprising at least one hydraulic, load-carrying assembly which includes at least one movable structural element and at least one hydraulic device for actuating the structural element, said hydraulic system comprising a primary circuit which includes a servo device, a stationary hydraulic pump driven by a motor, a directional valve, and said at least one hydraulic device, said directional valve being arranged between the hydraulic pump and the hydraulic device for allowing hydraulic oil to flow to the hydraulic device at a servo signal from the servo device in order to operate said assembly, wherein the hydraulic system comprises a supplementary circuit which is connected to the primary circuit between said directional valve and said hydraulic device and includes a variable hydraulic pump which is driven by the motor and which is arranged for supplying an adjustable addition of hydraulic oil to the hydraulic device, and a proportional valve which is arranged between the variable hydraulic pump and the hydraulic device in order to regulate the flow of hydraulic oil to the hydraulic device as a function of a received flow signal, said variable hydraulic pump including a load-detecting regulator which is arranged for detecting the load on the hydraulic device when the variable hydraulic pump is in operation.

10. Hydraulic system according to claim 9, wherein said vehicle is a truck provided with forks or a yoke.

11. Hydraulic system according to claim 9, wherein the proportional valve is connected to the servo device in order to receive said flow signal therefrom, said flow signal being a function of said servo signal, and wherein the regulator includes a power regulating device which is arranged in order to limit the displacement of the variable hydraulic pump in proportion to the load on the assembly.

12. Hydraulic system according to claim 11, wherein the supplementary circuit is calibrated in order to maximise the flow of hydraulic oil through the proportional valve for each load on the assembly, while taking the capacity of the motor into consideration.

* * * * *

UNITED STATES PATENT AND TRADEMARK OFFICE

CERTIFICATE OF CORRECTION

PATENT NO. : 7,069,722 B2
APPLICATION NO. : 10/503736
DATED : July 4, 2006
INVENTOR(S) : Lönn It is certified that error appears in the above-identified patent and that said Letters Patent is hereby corrected as shown below:

Front Page of Patent

Delete "(54) HYDRAULIC SYSTEM FOR A VEHICLE, A VEHICLE INCLUDING SUCH A HYDRAULIC SYSTEM AND A SUPLEMENTARY UNIT FOR SUCH A VEHICLE" and insert --(54) HYDRAULIC SYSTEM FOR A VEHICLE, A VEHICLE INCLUDING SUCH A HYDRAULIC SYSTEM AND A SUPPLEMENTARY UNIT FOR SUCH A VEHICLE--.

Column 1, line 3, delete "SUPLEMENTARY" and insert --SUPPLEMENTARY--.

Signed and Sealed this

Twenty-third Day of January, 2007

JON W. DUDAS
*Director of the United States Patent and Trademark Office*